United States Patent

[11] 3,612,256

[72] Inventors George R. Limbach
 Wayne;
 John Rieger, Teaneck; Martin F. Sheridan, Wayne; Richard H. Voss, Rutherford, all of N.J.
[21] Appl. No. 26,013
[22] Filed Apr. 6, 1970
[45] Patented Oct. 12, 1971
[73] Assignee Uniroyal, Inc.
 New York, N.Y.

[54] CONVEYOR BELT AND FABRIC THEREFOR
 20 Claims, 7 Drawing Figs.
[52] U.S. Cl. .................................................. 198/193, 139/425 R
[51] Int. Cl. ..................................................... B65g 15/30
[50] Field of Search ............................................ 198/193; 139/425 R

[56] References Cited
 UNITED STATES PATENTS
 3,077,947 2/1963 Peebles et al. ................. 139/425 R
 3,415,700 12/1968 Webster ......................... 198/193

Primary Examiner—Evon C. Blunk
Assistant Examiner—I. Kenneth Silverman
Attorney—Jack Posin ABSTRACT: An elastomer-covered conveyor belt employing a belting fabric having warps of metallic cables which are maintained coplanar, parallel and linear to equalize stress distribution therein and to insure that the belt will track truly. Selectively inwardly crimped, nonmetallic wefts are employed in respective layers above and below the warps in order to maintain the warps in proper positions relative to one another and to impart a desired degree of transverse stiffness to the fabric. The inward crimping of the wefts is achieved by positioning a plurality of nonmetallic binders between the warps in each pair of adjacent warps and selectively interlacing the binders with the upper and lower wefts. The binders between adjacent warps cross one another and form intersection points which abut against the warps and assist in maintaining the warps in proper position relative to one another. The belting fabric is preferably dipped in a resorcinol formaldehyde latex solution after weaving and then heat treated to remove the volatile components of such solution and shrink the nonmetallic weft and binder strands therein.

The foregoing abstract is neither intended to define the invention disclosed in this specification, nor is it intended to be limiting as to the scope of the invention in any way.

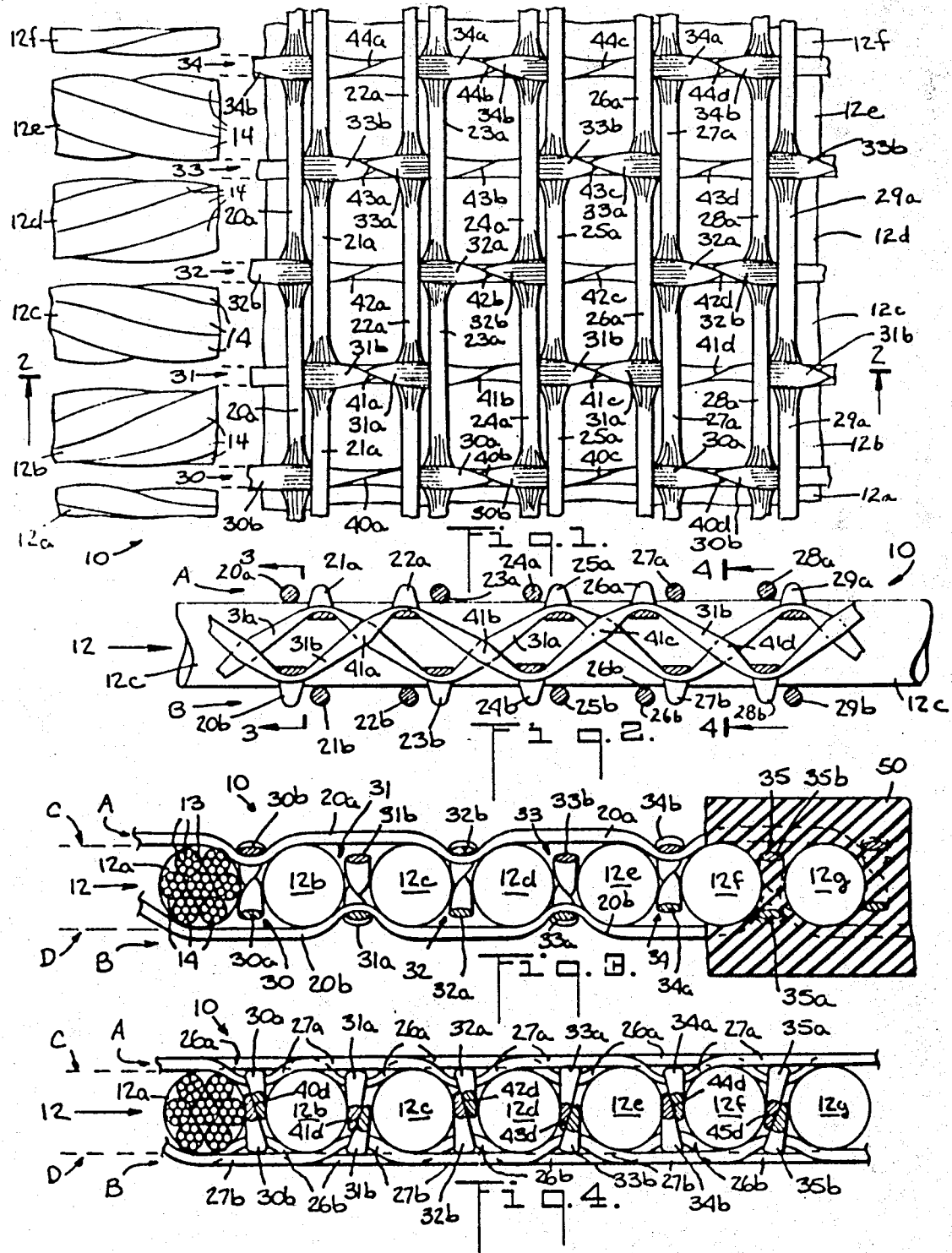

3,612,256

CONVEYOR BELT AND FABRIC THEREFOR

BACKGROUND OF THE INVENTION

This invention relates to elastomer-covered conveyor belts and, more particularly, to elastomer-covered conveyor belts having reinforcing warps therein of metallic cables.

Various types of metallic cable reinforced, elastomer-covered, conveyor belts have heretofore been manufactured for use, generally, in heavy-duty, commercial applications. In some cases these belts employ steel cables which serve as warps in non woven belts and in other cases the steel cable warps are utilized in woven belts.

In the case of nonwoven, steel cable warp belts, adjacent portions of the overall lengths of the steel cables are aligned and clamped under high and individually controlled tension. Then, an elastomer material in sheet form is applied to both sides of the cables and pressed into and around the cables in a hydraulic consolidating press, thus forming elastomer covers above and below the steel cable warps. This process is repeated in successive steps until the entire length of cables is encased in the rubber covers. In such belts there is a tendency for the cables to become misaligned and out of parallelism and linearity as a result of the flow of the elastomeric material between and around the cables. Also, the high and individually controlled cable tensions utilized in the manufacture of such belts requires that expensive auxiliary equipment be employed in making the belts. Further, in operation such conveyor belts rely on the elastomeric coating and internal tensions of the cables to secure transverse stiffness of the belt and this often results in longitudinal cracking of the elastomeric material along lines of flexing which are intermediate adjacent warp cables in the belt.

In the case of elastomer-covered conveyor belts which employ woven fabrics with steel cable warps, problems have also been encountered due the fact that the metal warps, which are woven under considerably less tension than in the nonwoven conveyor belts, have not been woven in such a way as to minimize the tendency of the warps to shift out of coplanarity, parallelism and linearity in the fabric. The weave patterns heretofore utilized have not insured that the various wefts and binders employed in the woven fabric lock each warp in position relative to the remaining warps in the fabric. Moreover, prior art forms of elastomer-covered conveyor belts which employ woven fabrics having steel cable warps have not included provisions therein to overcome transverse flexure problems similar to those mentioned in connection with the nonwoven belting fabrics. Thus, in transverse flexure these belts tend to articulate like the links in a chain, rather than bend like a beam, and this promotes premature cracking in and failure of the elastomeric covering material of the belt.

The term "elastomer," as used herein, has reference to natural and synthetic rubber and rubberlike materials and blends thereof.

SUMMARY OF THE INVENTION

The present invention overcomes the above-mentioned disadvantages of prior art elastomer covered, metallic cable warp, conveyor belts by incorporating therein a woven, metallic cable warp belting fabric in which the warps are maintained coplanar, parallel and linear to insure improved tracking of the conveyor belt and in which provision is made in the fabric to insure that the belt will tend to bend as a unit in transverse flexure, rather than tend to articulate or pivot between individual warps.

Accordingly, it is one object of this invention to provide an improved elastomer covered conveyor belt. It is a further object of this invention to provide an improved belting fabric for use in elastomer-covered conveyor belts.

Another object of this invention is to provide an improved belting fabric employing metallic cable warps and nonmetallic wefts and binders.

A further object of this invention is to provide an improved belting fabric having metallic cable warps and in which nonmetallic wefts and binders are employed in such a way as to maintain the warps linear, parallel, and coplanar.

Another object of this invention is to provide an improved belting fabric employing metallic warps and nonmetallic wefts and binders in which the fabric tends to bend throughout its width in transverse flexure, rather than tending to articulate or pivot between individual warps thereof.

Further objects and advantages of this invention will become apparent as the following description proceeds.

Briefly stated, and in accordance with one embodiment of this invention, there is provided an elastomer-covered conveyor belt including a belting fabric having warps of metallic cables. In order to secure improved tracking of the conveyor belt, the warps are compacted and maintained coplanar, parallel and linear by selectively inwardly crimped wefts, which wefts are positioned in layers above and below the warps, and by the crossover or intersection points of a plurality of binders, which plurality of binders are positioned between the warps in each pair of adjacent warps. The wefts are crimped inwardly at selected points therein by the binders, and such weft crimps, together with the various binder crossover or intersection points between the warps in each pair of adjacent warps, bear against such adjacent warps at spaced points therealong in order to maintain the warps in proper position, alignment and linearity. Transverse stiffness of the fabric is achieved by having adjacent crimped points in each individual weft spaced apart so that the wefts span a cluster of warps between each pair of adjacent crimps, and by having the clusters of warps defined between adjacent crimps in each one of a plurality of wefts in each weft layer differ in part from the clusters of warps defined between adjacent crimps in each one of another plurality of warps in the same weft layer. The belting fabric may be compacted and stabilized after weaving and before being coated with an elastomer by treating the same with a resorcinol formaldehyde latex solution and then heating the fabric to shrink the weft and binder strands therein.

BRIEF DESCRIPTION OF THE DRAWINGS

While the specification concludes with one or more claims particularly pointing out and distinctly claiming the subject matter of this invention, it is believed that the invention will be better understood from the following description, taken in conjunction with the accompanying drawings, in which:

FIG. 1 is a plan view of one form of belting fabric made in accordance with the present invention;

FIG. 2 is a sectional elevational view, taken along the line 2—2 of FIG. 1;

FIG. 3 is a sectional elevational view, taken along the line 3—3 of FIG. 2, and showing a portion of the elastomeric material in which the belting fabric is embedded;

FIG. 4 is a sectional elevational view, taken along the line 4—4 of FIg. 2;

Referring to FIGS. 1-4 of the drawings, there has been illustrated one form of belting fabric, shown generally at 10, made in accordance with this invention. The belting fabric 10 includes a layer of strength warps, shown generally at 12 (FIGS. 2-4), which layer of warps comprises a plurality of substantially uncrimped parallel, coplanar, metallic cable warps 12a-12 (FIG. 4). The warps 12a-12g may comprise, for example, a brass plated steel cable such as the 7/7/7 type MI-50 made by Bekaert Steel Wire Corporation of 245 Park Avenue, New York, N.Y. 11017. In this type of cable, seven brass plated steel strands are twisted together to form cords, such as cords 13 (FIG. 3); then seven of the cords 13 are twisted together to form wires, such as the wires 14; and then, finally, seven of the wires 14 are twisted together to form each of the various cables 12a-12g.

Figure 5:
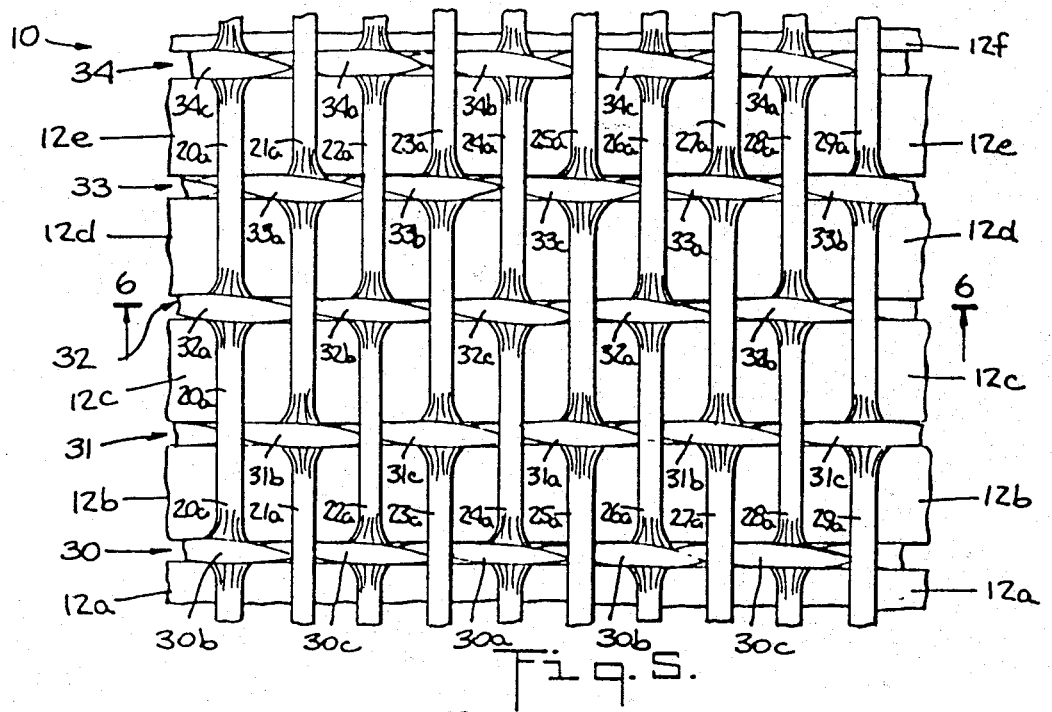
FIG. 5 is a plan view of another form of belting fabric made in accordance with this invention.

As shown most clearly in FIG. 1, the wires 14 of the individual warps, such as warp 12c, are twisted in an opposite direction from the wires 14 of the cables o either side thereof, such as the wires 14 of cables 12b and 12d. This aids in cancelling out any accumulative distortion effect that might otherwise be imparted to the belting fabric 10 due to the twist of the wires 14 in the various cable warps 12a-12g.

The belting fabric 10 is provided with a first group, shown generally at A (FIG. 2), of parallel, substantially coplanar, wefts 20a-29a positioned above and transverse to the layer of warps 12, and a second group, shown generally at B, of parallel, substantially coplanar wefts 20b-29b positioned below and transverse to the layer of warps 12. The various individual wefts in lower group B are in vertical alignment with, and thus in opposition in the fabric to, the corresponding wefts in upper group A. The wefts in groups A and B may, for example, comprise a 1,260-denier/eight-ply type 6 nylon in accordance with one embodiment of this invention.

Each of the various warps 12a-12g (FIGS. 1 and 3) is spaced from the warps next adjacent thereto by respective pluralities of binders, shown generally at 30, 31 32, 33, 34 and 35. Each of the various pluralities of binders 30-35 comprises two binders, 30a and 30b, 31a and 31b, 32a and 32b, 33a and 33b, 34a and 34b, and 35a and 35b, respectively, which interlace with different wefts from one another and have paths which cross one another in the manner shown in FIG. 2. The binders 31a, 31b, 32a, 32b, 33a, 33b, 34a, 34b, and 35a and 35b may, for example, be formed from a 1,260-denier/nine-ply type 6 nylon in accordance with one embodiment of this invention.

The pluralities of binders 30, 32 and 34 are positioned between each of a first series of adjacent pairs of warps, comprising pair 12a, 12b; pair 12c, 12d; and pair 12e, 12f. The binders in such pluralities 30, 32 and 34 interlace selectively with the same, nonopposing, wefts alternately above and below the layer of warps 12. Thus, the pluralities of binders 30, 32 and 34 each interlace with the wefts 20a 23a, 24a, 27a and 28a above the warp layer 12, and with the wefts 21b, 22b, 25b, 26b and 29b below the warp layer 12. Similarly, the pluralities of binders 31, 33 (FIG. 1) and 35 (FIG. 3) are positioned between each of a second series of adjacent pairs of warps, comprising pair 12b, 12c; pair 12d, 12e; and pair 12f, 12g. The binders in such pluralities of binders 31, 33 and 35 interlace selectively with the same, nonopposing, wefts alternately above and below the layer of warps 12, which interlaced wefts differ from those wefts interlaced by the pluralities of binders 30, 32 and 34. Thus, as may be seen most clearly in FIG. 1, the pluralities of binders 31 and 33 each interlace with the wefts 21a, 22a, 25a, 26a and 29a in the upper group A of wefts, and with the wefts 20b, 23b, 24b, 27b and 28b in the lower group B of wefts.

Each of the binders between the warps in a pair of adjacent warps is interlaced with wefts which differ from those wefts interlaced by the other of the binders between the warps in the same pair of adjacent warps. Thus, referring to FIG. 2, binder 31a interlaces with wefts 21a, 23b, 25a, 27b and 29a, and binder 31b interlaces with wefts 20b, 22a, 24b, 26a and 28b. The wefts in upper and lower weft groups A and B are crimped inwardly at the points of interlacing thereof with the binders in the pluralities of binders 30-35 so as to dispose the points of interlacing within the confines of the space defined between the upper and lower surface tangent lines C and D, respectively, of the arrangement of warps 12.

Referring in particular to FIg. 3, the crimps in each of the wefts are spaced from one another so that, between each pair of adjacent crimps in each individual weft, the weft spans a cluster of warps. Thus, weft 20a in the upper group A of wefts is crimped inwardly by binders 30b and 32b, and the points of inward crimping of weft 20a by binders 30b and 32b are spaced apart so that the weft 20a spans a cluster of warps, comprising warps 12b and 12c, between such points of inward crimping. Similarly, in the lower group B of wefts, the weft 20b is crimped inwardly by binders 31a and 33a, and the points of inward crimping of weft 20b by binders 31a and 33a are spaced apart so that the weft 20b spans a cluster of warps, comprising warps 12c and 12d, between such points of inward crimping.

As shown most clearly in FIGS. 1 and 4, the clusters of warps defined between adjacent crimps by each one of a plurality of wefts in each group of wefts differ at least in part from the clusters of warps defined between adjacent crimps by each one of another plurality of wefts in the same group. Thus, wefts 20a, 23a, 24a, 27a and 28a in the upper weft group A define a first cluster of warps, between the crimps caused by the binders in the pluralities of binders 30 and 32, which first cluster of warps comprises warps 12b and 12c. The wefts 21a, 22a, 25a, 26a and 29a, on the other hand, define a second cluster of warps, between the crimps caused by the binders in the pluralities of binders 31 and 33, which second cluster of warps differs in part from the first cluster in that it differs in part from the first cluster in that it comprises warps 12c and 12d, rather than warps 12b and 12c.

As shown more clearly in FIGS. 1, 2 and 4, the binders in each plurality of binders cross one another between respective pairs of adjacent warps at crossover or intersection points located alternately above and below the median plane of the warps. Thus, the binders 30a and 30b in the plurality of binders 30 cross one another at the intersections 40a-40d between the pair of adjacent warps 12a, 12b; the binders 31a and 31b in the plurality of binders 31 cross one another at the intersections 41a14"d between the pair of adjacent warps 12b, 12c; the binders 32a and 32b in the plurality of binders 32 cross one another at the intersections 42a-42d between the pair of adjacent warps 12c, 12d; the binders 33a and 33b in the plurality of binders 33 cross one another at the intersections 43a-43 between the pair of adjacent warps 12d, 12e; and, the binders 34a and 34b in the plurality of binders 34 cross one another at the intersections 44a-44d between the pair of adjacent warps 12e, 12f.

Referring to FIG. 4, the spacing of the various warps 12a-12bq from one another is preferably made sufficiently small relative to the tension in and the diameter of the binders 30a-35a and 30b-35b that the binder intersections 40a-40d, 41a-41bq, 42a-42d, 43a-43d, and 44a-44d are maintained in firm abutment with the respective warps 12a-12g. This causes the binder intersections to aid the weft crimps in compacting the fabric 10 and retaining the warps 12a-12g firmly in position relative to one another in the fabric.

Figure 6:
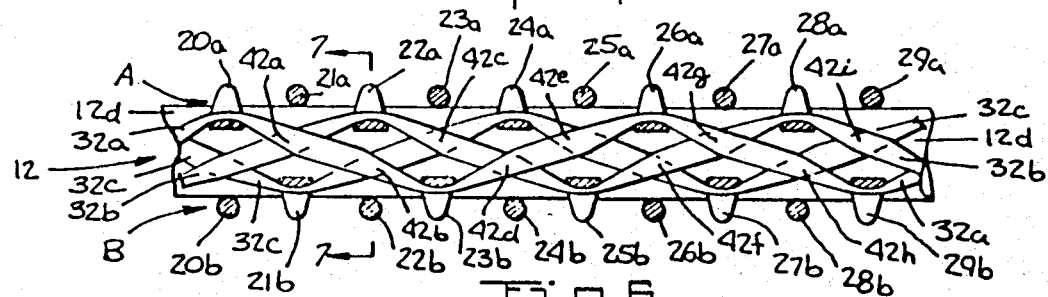
FIG. 6 is a sectional elevational view, taken along the line 6—6 of FIG. 5; and, FIG. 7 is a sectional elevational view, taken along the line 7—7 of FIG. 6.
Figure 7:
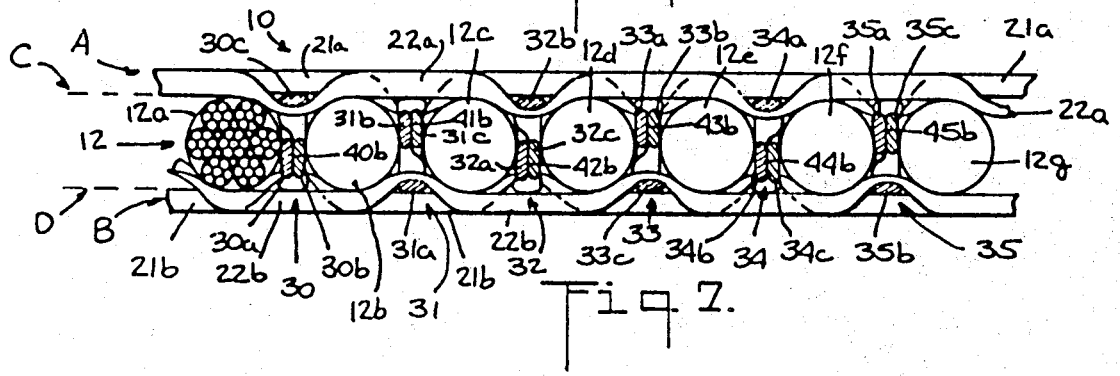

Referring now to FIGS. 5-7, there has been illustrated an embodiment of this invention in which three binders are woven into the fabric 10 between the warps in each pair of adjacent warps, rather than the two binders between warps of the embodiment shown in FIGS. 1 through 4. Similar reference numerals are employed in the three binders between warps embodiment of FIGS. 5-7 to identify parts in this embodiment which correspond to parts in the two binders between warps embodiment of FIGS. 1-4.

The three binders between warps embodiment includes a belting fabric 10 having a layer of strength warps, shown generally at 12 (FIGS. 6 and 7), which layer of warps comprises a plurality of substantially uncrimped, parallel, coplanar, metallic cable warps 12a-12g (FIG. 7). The belting fabric 10 is provided with a first group, shown generally at A, of parallel, substantially coplanar wefts 20a-29a positioned above and transverse to the layer of warps 12, and a second group, shown generally at B, of parallel, substantially coplanar wefts 20b-29b positioned below and transverse to the layer of warps 12, the wefts in lower group B being in opposition in the fabric c to the wefts in upper group A.

Each of the various warps 12a-12g is spaced from the warps next adjacent thereto by respective pluralities of binders, shown generally at 30, 31, 32, 33, 34 and 35. In this three binders between warps embodiment, however, each of the various pluralities of binders 30-35 comprises three binders, 30a-30b[, 31a-31c, 32a-32c, 33a-33c, 34a-34c and 35a-35c respectively, which binders interlace with different wefts from one another and have paths which cross one another in the manner shown in FIG. 6.

The pluralities of binders 30, 32 and 34 are positioned between each of a first series of adjacent pairs of warps, comprising pair 12a, 12b; pair 12c, 12d; and pair 12e, 12f. The binders in such pluralities of binders 30, 32 and 34 interlace selectively with the same, nonopposing wefts alternately above and below the layer of warps 12. Thus, the pluralities of binders 30, 32 and 34 each interlace with the wefts 20a, 22a, 24a, 26a and 28a above the warp layer 12, and with the wefts 21b, 23b, 25b, 27b and 29b below the warp layer 12. Similarly, the pluralities of binders 31, 33 and 35 are positioned between each of a second series of adjacent pairs of warps, comprising pair 12b, 12c; pair 12d, 12e; and pair 12f, 12g. The binders in such pluralities of binders 31, 33 and 35 interlace selectively with the same, nonopposing, wefts alternately above and below the layer of warps 12, which interlaced wefts differ from those wefts interlaced by the pluralities of binders 30, 32 and 34. Thus, as may be seen most clearly in FIG. 5, the pluralities of binders 31, 33 and 35 each interlace with the wefts 21a, 23a, 25a, 27a and 29a in the upper group A of wefts, and with the wefts 20b, 22b, 24b, 26b and 28b in the lower group B of wefts.

Each of the binders between the warps in a pair of adjacent warps in the FIGS. 5–7 embodiment is interlaced with wefts which differ from those wefts interlaced by the other of the binders between the warps in the same pair of adjacent warps. Thus, referring to FIG. 6, binder 32a interlaces with wefts 20a, 23b, 26a and 29b, binder 32b interlaces with wefts 22a, 25b, and 28 a, and binder 32c interlaces with wefts 21b, 24a and 27b. The wefts in upper and lower weft groups A and B are crimped inwardly at the points of interlacing thereof with the binders in the pluralities of binders 30 through 35 so as to dispose the points of interlacing within the confines of the space defined between the upper and lower surface tangent planes C and D, respectively, of the arrangement of warps 12.

Referring in particular to FIG. 7, the crimps in each of the wefts in the three binders between warps embodiment of FIGS. 5–7 are spaced from one another so that, between each pair of adjacent crimps in each individual weft, the weft spans a cluster of warps. Thus, weft 22a in the upper group A of wefts is crimped inwardly by binders 30c and 32b, and the points of inward crimping of weft 22a by binders 30c and 32b are spaced apart so that the weft 22a spans a cluster of warps, comprising warps 12b and 12c, between such points of inward crimping. Similarly, in the lower group B of wefts, the weft 22b is crimped inwardly by binders 31a and 33c, and the points of inward crimping of weft 22b by binders 31a and 33c are spaced apart so that the weft 22b spans a cluster of warps, comprising warps 12c and 12d, between such points of inward crimping.

As shown most clearly in FIGS. 5 and 7, the clusters of warps defined between adjacent crimps by each one of a plurality of wefts in each group differ at least in part from the clusters of warps defined between adjacent crimps by each one of another plurality of wefts in the same group. Thus, wefts 20a, 22a, 24a, 26a and 28a 01 in the upper weft group A define a first cluster of warps between the crimps caused by the binders of pluralities of binders 30 and 32, which first cluster of warps comprises warps 12b and 12c. The wefts 21a, 23a, 25a, 27a and 29a, on the other hand, define a second cluster of warps between the crimps caused by the binders in the pluralities of binders 31 and 33, which second cluster of warps differ in part from the first cluster in that it comprises warps 12c and 12d rather than warps 12b and 12c.

The binders in each plurality of binders of the FIGS. 5–7 embodiment cross one another between respective pairs of adjacent warps at crossover or intersection points located alternately above and below the median plane of the warps. Thus, referring to FIG. 6, the binders 32a, 32b and 32c in the plurality of binders 32 cross one another at the intersections 42a–42 between the pair of adjacent warps 12c–12d. Similar considerations apply to the various binders in the pluralities of binders 30, 31, 33, 34 and 35.

As in the case of the embodiment of FIGS. 1–4, the spacing of the various warps 12a–12g from one another in the three binders between warps embodiment of FIGS. 5–7 is preferably made sufficiently small relative to the tension in and the diameter of the binders 30a–35a, 30b–35b and 30c–35c that the binder intersections 42a–42i, and the corresponding binder intersections in the pluralities of binders 30, 31, 33, 34 and 35, are maintained in firm abutment with respective warps 12a–12g. This causes the binder intersections to aid the weft crimp in compacting the fabric 10 and in retaining the warps 12a–12 firmly in position relative to one another in the fabric.

The fabric 10 in each of the embodiments described herein may be woven on conventional loom which are suitably modified to handle the metallic warps in a manner well known to those skilled in the art. After weaving, the fabric 10 is preferably dipped in a resorcinol formaldehyde latex solution and then heat treated to remove the volatile components of such solution and shrink the nonmetallic wefts and binders in the fabric. This causes the fabric 10 to become compacted as indicated earlier. In addition, the resorcinol formaldehyde latex treatment preconditions the fabric to provide improved bonding between the fabric and the elastomeric material 50 (FIG. 3) in which it is embedded. The elastomeric material 50 is applied to the fabric 10 in a conventional manner after the latter has been heat treated. Following application of the elastomeric material 50 to the belting fabric 10, the resulting conveyor belt is passed through a curing press or other vulcanization means in a known manner to form the completed, elastomer covered, conveyor belt.

From the foregoing description it will be apparent that an improved elastomer covered conveyor belt is provided by this invention. The conveyor belt employs an improved belting fabric having metallic cable warps and nonmetallic wefts and binders, which nonmetallic wefts and binders are so arranged as to maintain the warps linear, parallel and coplanar in the fabric. Moreover, the arrangement is such that the resulting belting fabric and conveyor belt tends to bend throughout its width when placed in transverse flexure, rather than tending to articulate or pivot between the individual warps thereof.

While particular embodiments of this invention have been shown and described, it will be obvious to those skilled in the art that various changes and modifications may be made without departing from this invention in its broader aspects. For example, glass fiber or other high modulus nonmetallic materials could be employed for the warps of the belting fabric. It is, therefore, aimed in the appended claims to cover all such changes and modifications as fall within the true spirit and scope of this invention.

Having thus described the invention, what is claimed as new and desired to be protected by Letters Patent of the United States is:

1. A belting fabric, comprising a plurality of substantially uncrimped, parallel, coplanar warps, a first group of parallel, substantially coplanar wefts positioned above said warps and transverse thereto, a second group of parallel, substantially coplanar wefts positioned below said warps and transverse thereto, a first plurality of binders positioned between each of a first series of adjacent pairs of warps and interlaced with selected wefts above and below the warps in alternating sequences, a second plurality of binders positioned between each of a second series of adjacent pairs of warps and interlaced above and below the warps in alternating sequences with wefts other than said selected wefts, each of the binders between each pair of adjacent warps being interlaced with wefts other than those interlaced with the others of the binders between the same pair of adjacent warps, the wefts being crimped inwardly at the points of interlacing thereof with the binders so as to dispose the points of interlacing within the confines of the space defined between the upper and lower surface tangent planes of the arrangement of warps, the crimps in each of said wefts being spaced from one another so that between each pair of adjacent crimps therein each weft spans a cluster of warps, the clusters of warps defined between adjacent crimps by each one of a plurality of wefts in each group differing at least in part from the clusters of warps defined between adjacent crimps by each one of another plurality of wefts in the same group.

2. A belting fabric as described in claim 1 wherein the binders between each pair of adjacent warps cross one another at intersections located alternately above and below the median plane of the warps, the spacing between adjacent warps being such, relative to the tension in and diameter of the binders, that the binder intersections abut said adjacent warps, the binder intersections and the crimps in said wefts together serving to firmly position said warps relative to one another in the fabric.

3. A belting fabric, comprising a plurality of substantially uncrimped, parallel, coplanar metallic cable warps, a first group of parallel, substantially coplanar, nonmetallic wefts positioned above said warps and transverse thereto, a second group of parallel, substantially coplanar, non metallic wefts positioned below said wefts below said warps and transverse thereto, the wefts above said warps and the wefts below said warps being in opposition in the fabric, a first plurality of non metallic binders positioned between each of a first series of adjacent pairs of warps and interlaced with selected wefts above and below the warps in alternating sequences, the wefts interlaced by said first plurality of binders being in nonopposition in the fabric, a second plurality of nonmetallic binders positioned between each of a second series of adjacent pairs of warps and interlaced above and below the warps in alternating sequence with wefts other than said selected wefts, the wefts interlaced by said second plurality of binders being in nonopposition in the fabric, each of the binders between each pair of adjacent warps being interlaced with wefts other than those interlaced with the others of the binders between the same pair of adjacent warps, the wefts being crimped inwardly at the points of interlacing thereof with the binders so as to dispose the points of interlacing within the confines of the space defined between the upper and lower surface tangent planes of the arrangement of warps, the crimps in each of said wefts being spaced from one another so that between each pair of adjacent crimps therein each weft spans a cluster of warps, the clusters of warps defined between adjacent crimps by each one of a plurality of wefts in each group differing at least in part from the clusters of warps defined between adjacent crimps by each one of another plurality of wefts in the same group.

4. A belting fabric as described in claim 3 wherein the binders between each pair of adjacent warps cross one another at intersections located alternately above and below the median plane of the warps, the spacing between adjacent warps being such, relative to the tension in and diameter of the binders, that the binder intersections abut said adjacent warps, the binder intersections and the crimps in said wefts together serving to firmly position said warps relative to one another in the fabric.

5. A belting fabric as described in claim 4, said cable warps being formed from strands of brass plated steel, said wefts and binders being made of nylon.

6. A conveyor belt, said conveyor belt comprising a belting fabric including a plurality of substantially uncrimped, parallel, coplanar, metallic cable warps, a first group of parallel, substantially coplanar, wefts positioned above said warps and transverse thereto, a second group of parallel substantially coplanar wefts positioned below said warps and transverse thereto, a first plurality of binders positioned between each of a first series of adjacent pairs of warps and interlaced with selected wefts above and below the warps in alternating sequences, a second plurality of binders positioned between each of a second series of adjacent pairs of warps and interlaced above and below the warps in alternating sequences with wefts other than said selected wefts, each of the binders between each pair of adjacent warps being interlaced with wefts other than those interlaced with the others of the binders between the same pair of adjacent warps, the wefts being crimped inwardly at the points of interlacing thereof with the binders so as to dispose the points of interlacing within the confines of the space defined between the upper and lower surface tangent planes of the arrangement of warps, the crimps in each of said wefts being spaced from one another so that between each pair of adjacent crimps therein each weft spans a cluster of warps, the clusters of warps defined between adjacent crimps by each one of a plurality of wefts in each group differing at least in part from the clusters of warps defined between adjacent crimps by each one of another plurality of wefts in the same group, said belting fabric being coated with an elastomeric material.

7. A conveyor belt as described in claim 6 wherein the binders between each pair of adjacent warps cross one another at intersections located alternately above and below the median plane of the warps, the spacing between adjacent warps being such, relative to the tension in and diameter of the binders, that the binder intersections abut said adjacent warps, the binder intersections and the crimps in said wefts together serving to firmly position said warps relative to one another in the fabric.

8. A conveyor belt, said conveyor belt comprising a belting fabric including a plurality of substantially uncrimped, parallel, coplanar, metallic cable warps, a first group of parallel, substantially coplanar, nonmetallic wefts positioned above said warps and transverse thereto, a second group of parallel, substantially coplanar nonmetallic wefts positioned below said warps and transverse thereto, the wefts above said warps and the wefts below said warps being in opposition in the fabric, a first plurality of nonmetallic binders positioned between each of a first series of adjacent pairs of warps and interlaced with selected wefts above and below the warps in alternating sequences, the wefts interlaced by said first plurality of binders being in nonopposition in the fabric, a second plurality of nonmetallic binders positioned between each of a second series of adjacent pairs of warps and interlaced above and below the warps in alternating sequences with wefts other than said selected wefts, the wefts interlaced by said second plurality of binders being in nonopposition in the fabric, each of the binders between each pair of adjacent warps being interlaced with wefts other than those interlaced with the others of the binders between the same pair of adjacent warps, the wefts being crimped inwardly at the points of interlacing thereof with the binders so as to dispose the points of interlacing within the confines of the space defined between the upper and lower surface tangent planes of the arrangement of warps, the crimps in each of said wefts being spaced from one another so that between each pair of adjacent crimps therein each weft spans a cluster of warps, the clusters of warps defined between adjacent crimps by each one of a plurality of wefts in each group differing at least in part from the clusters of warps defined between adjacent crimps by each one of another plurality of wefts in the same group, said belting fabric being coated with an elastomeric material.

9. A conveyor belt as described in claim 8 wherein the binders between each pair of adjacent warps cross one another at intersections located alternately above and below the median plane of the warps, the spacing between adjacent warps being such, relative to the tension in and diameter of the binders, that the binder intersections abut said adjacent warps, the binder intersections and the crimps in said wefts together serving to firmly position said warps relative to one another in the fabric.

10. A conveyor belt as described in claim 9, said cable warps being formed from strands of brass plated steel, said wefts and binders being made of nylon.

11. A conveyor belt comprising the belting fabric of claim 1 coated with an elastomeric material.

12. A conveyor belt as described in claim 11, the warps of said belting fabric comprising strands of a high modulus, nonmetallic material.

13. A conveyor belt as described in claim 11, the warps of said belting fabric comprising strands of glass fibers.

14. A conveyor belt as described in claim 11, the warps of said belting fabric comprising metallic cables, the wefts and binders of said belting fabric being nonmetallic.

15. A belting fabric as described in claim 1, the wefts above said warps and the wefts below said warps being in opposition in the fabric, the wefts interlaced by said first plurality of binders being in nonopposition in the fabric, and the wefts interlaced by said second plurality of binders being in nonopposition in fabric.

16. A conveyor belt comprising the belting fabric of claim 1 coated with an elastomeric material.

17. A conveyor belt as described in claim 16, the warps of said belting fabric comprising strands of a high modulus, nonmetallic material.

18. A conveyor belt as described in claim 16, the warps of said belting fabric comprising strands of glass fibers.

19. A belting fabric as described in claim 15 wherein the binders between each pair of adjacent warps cross one another at intersections located alternately above and below the median plane of the warps, the spacing between adjacent warps being such, relative to the tension in and diameter of the binders, that the binder intersections abut said adjacent warps, the binder intersections and the crimps in said wefts together serving to firmly position said warps relative to one another in the fabric.

20. A conveyor belt comprising the belting fabric of claim 19 coated with an elastomeric material, the warps of said belting fabric comprising strands of glass fibers, the wefts and binders of said belting fabric being made of nylon.

PO-1050
(5/69)

UNITED STATES PATENT OFFICE
CERTIFICATE OF CORRECTION

Patent No. 3,612,256      Dated October 12, 1971

Inventor(s) G. R. LIMBACH et al.

It is certified that error appears in the above-identified patent and that said Letters Patent are hereby corrected as shown below:

In the upper right hand corner of each of sheets 1 and 2 of the drawings the number "3,622,256" should read --3,612,256--. In column 2, line 67, the numeral "12" should read --12g--; line 70, the numeral "11017" should read --10017--. Column 3, line 3, the letter "o" should be replaced by the word --on--. Column 4, line 16, delete the phrase "differs in part from the first cluster in that it"; line 27, the numeral "41a14"d" should read --41a-41d--; line 32, the numeral "43" should read --43d--; line 37, the numeral "12bq" should read --12g--; line 40, the numeral "41bq" should read --41d--; line 72, the designation "30b[" should read --30c--. Column 5, line 12, insert a semicolon (;) after the numeral "12c"; line 55, delete the numeral "01"; lines 55-58, the italicized statement "in the upper weft group A...which first cluster of warps comprises warps" should not be italicized; line 70, the numeral "42" should read --421--. Column 6, line 12, the word "loom" should read --looms--. Column 7, line 18, delete the phrase "wefts below said"; line 28, the word "sequence" should read --sequences--; line 62, after "parallel" and before "substantially," insert --a comma (,)--. Column 8, line 61, the word "about" should read --abut--. Column 9, line 9, after "in" and before "fabric", insert --the--.

Signed and sealed this 24th day of October 1972.

(SEAL)
Attest:

EDWARD M. FLETCHER, JR.
Attesting Officer

ROBERT GOTTSCHALK
Commissioner of Patents